United States Patent
Priedeman, Jr.

(10) Patent No.: US 12,157,800 B2
(45) Date of Patent: Dec. 3, 2024

(54) METHOD FOR UNDERWATER PROCESSING OF WATER-DISPERSIBLE MATERIALS

(71) Applicant: Stratasys, Inc., Eden Prairie, MN (US)

(72) Inventor: William R. Priedeman, Jr., Long Lake, MN (US)

(73) Assignee: Stratasys, Inc., Eden Prairie, MN (US)

(*) Notice: Subject to any disclaimer, the term of this patent is extended or adjusted under 35 U.S.C. 154(b) by 157 days.

(21) Appl. No.: 17/717,570

(22) Filed: Apr. 11, 2022

(65) Prior Publication Data

US 2022/0325050 A1 Oct. 13, 2022

Related U.S. Application Data

(60) Provisional application No. 63/173,704, filed on Apr. 12, 2021.

(51) Int. Cl.
*C08J 3/24* (2006.01)
*B29C 48/05* (2019.01)
(Continued)

(52) U.S. Cl.
CPC ............ *C08J 3/245* (2013.01); *B29C 48/05* (2019.02); *B29C 48/802* (2019.02);
(Continued)

(58) Field of Classification Search
CPC ..... B29B 2009/163; B29B 9/16; B29C 48/04; B29C 48/05; B29C 48/919; B29C 64/40;
(Continued)

(56) References Cited

U.S. PATENT DOCUMENTS 2,696,482 A 12/1954 Pease
3,000,854 A * 9/1961 Favre ............... C08K 5/13
523/303
(Continued)

FOREIGN PATENT DOCUMENTS

CA 3052023 A1 8/2018
CN 107206673 A 2/2015
(Continued)

OTHER PUBLICATIONS

International Search Report and Written Opinion of PCT/US2019/055694, filed Oct. 10, 2019, mailed Mar. 6, 2020.
(Continued)

*Primary Examiner* — Jeffrey M Wollschlager
(74) *Attorney, Agent, or Firm* — Westman, Champlin & Koehler, P.A.

(57) ABSTRACT

A method of processing a water-dispersible, polymer-based material in a bath of a water-based solution includes providing a molten water-dispersible polymer material having monovalent cations. The water-dispersible polymer is introduced into a water bath comprising multivalent salt dissociated in the water bath into multivalent cations and anions. The water-dispersible polymer is retained within the water bath with the dissociated multivalent cations to quench the water-dispersible, polymer-based material while the monovalent cations proximate a surface of the water-dispersible polymer are exchanged with multivalent cations to form a barrier that temporarily resists dispersion of the water-dispersible, polymer-based material within the water bath. The method includes removing the water-dispersible polymer from water bath after the exchange step.

17 Claims, 2 Drawing Sheets

(51) Int. Cl.
| | |
|---|---|
| *B29C 48/80* | (2019.01) |
| *B29C 48/88* | (2019.01) |
| *B29C 64/40* | (2017.01) |
| *B29C 71/00* | (2006.01) |
| *B29K 81/00* | (2006.01) |
| *C08J 3/07* | (2006.01) |
| *C08J 3/12* | (2006.01) |
| *C08J 3/14* | (2006.01) |

(52) U.S. Cl.
CPC ........ *B29C 48/919* (2019.02); *B29C 71/0009* (2013.01); *C08J 3/07* (2013.01); *C08J 3/12* (2013.01); *C08J 3/14* (2013.01); *B29C 64/40* (2017.08); *B29K 2081/00* (2013.01); *C08J 2381/00* (2013.01)

(58) Field of Classification Search
CPC ...... B29C 48/802; B29C 71/0009; C08J 3/12; C08J 3/124; C08J 3/128; C08J 3/07; C08J 3/14; C08J 2381/00; C08J 3/245; C08G 63/688–6888; B29K 2081/00
USPC .............................. 425/67, 68; 264/142, 143
See application file for complete search history.

(56) References Cited

U.S. PATENT DOCUMENTS

| | | |
|---|---|---|
| 3,296,204 A | 1/1967 | Caldwell |
| 3,779,993 A | 12/1973 | Kibler et al. |
| 4,304,901 A | 12/1981 | O'Neill et al. |
| 4,746,717 A | 5/1988 | Larson |
| 4,801,388 A | 1/1989 | Fong et al. |
| 4,855,384 A | 8/1989 | Larson |
| 4,863,538 A | 9/1989 | Deckard |
| 4,904,531 A * | 2/1990 | Kelly ................. C08J 3/124 |
| | | 428/407 |
| 4,931,510 A | 6/1990 | Sackman et al. |
| 4,940,744 A * | 7/1990 | Tortorici ................. C08K 3/10 |
| | | 524/437 |
| 5,132,143 A | 7/1992 | Deckard |
| 5,204,055 A | 4/1993 | Sachs et al. |
| 5,369,210 A * | 11/1994 | George ............. C08G 63/6886 |
| | | 528/286 |
| 5,503,785 A | 4/1996 | Crump et al. |
| 5,679,754 A | 10/1997 | Larson et al. |
| 6,004,124 A | 12/1999 | Swanson et al. |
| 6,067,480 A | 5/2000 | Stuffle et al. |
| 6,070,107 A | 5/2000 | Lombardi et al. |
| 6,228,923 B1 | 5/2001 | Lombardi et al. |
| 6,437,034 B2 | 8/2002 | Lombardi et al. |
| 6,547,995 B1 | 4/2003 | Comb |
| 6,645,412 B2 | 11/2003 | Priedeman, Jr. |
| 6,680,364 B1 | 1/2004 | Linemann |
| 7,122,246 B2 | 10/2006 | Comb et al. |
| 7,384,255 B2 | 6/2008 | LaBossiere et al. |
| 7,604,470 B2 | 10/2009 | LaBossiere et al. |
| 7,625,200 B2 | 12/2009 | Leavitt |
| 7,896,209 B2 | 3/2011 | Batchelder et al. |
| 8,153,182 B2 | 4/2012 | Comb et al. |
| 8,221,858 B2 | 7/2012 | Mannella et al. |
| 8,419,996 B2 | 4/2013 | Swanson et al. |
| 8,488,994 B2 | 7/2013 | Hanson et al. |
| 8,647,102 B2 | 2/2014 | Swanson et al. |
| 8,652,636 B2 * | 2/2014 | Beck ..................... C08B 15/08 |
| | | 106/163.01 |
| 8,879,957 B2 | 11/2014 | Hanson et al. |
| 8,926,882 B2 | 1/2015 | Batchelder et al. |
| 9,399,691 B2 | 7/2016 | Ruggieri et al. |
| 9,423,756 B2 | 8/2016 | Hanson et al. |
| 9,523,934 B2 | 12/2016 | Orrock et al. |
| 9,557,661 B2 | 1/2017 | Martin |
| 9,777,090 B2 | 10/2017 | Ruggieri et al. |
| 10,100,168 B2 | 10/2018 | Bayer et al. |
| 10,308,743 B2 | 6/2019 | Ruggieri |
| 10,982,043 B2 | 4/2021 | Priedeman, Jr. |
| 2004/0260034 A1 * | 12/2004 | Haile ...................... D01F 6/84 |
| | | 525/437 |
| 2005/0004282 A1 | 1/2005 | Priedeman et al. |
| 2007/0041796 A1 * | 2/2007 | Irie ............................ C08J 7/06 |
| | | 524/556 |
| 2008/0207833 A1 | 8/2008 | Bear et al. |
| 2011/0095444 A1 | 4/2011 | Haile et al. |
| 2013/0077996 A1 | 3/2013 | Hanson et al. |
| 2013/0077997 A1 | 3/2013 | Hanson et al. |
| 2013/0186549 A1 | 7/2013 | Comb et al. |
| 2013/0186558 A1 | 7/2013 | Comb et al. |
| 2013/0192779 A1 | 8/2013 | Parker et al. |
| 2015/0024316 A1 | 1/2015 | Orrock et al. |
| 2015/0227062 A1 | 8/2015 | Martin |
| 2017/0022341 A1 | 1/2017 | Bayer et al. |
| 2017/0232684 A1 | 8/2017 | Yoshimura et al. |
| 2017/0240675 A1 | 8/2017 | Yoshimura et al. |
| 2017/0369622 A1 | 12/2017 | Inouble et al. |
| 2018/0009160 A1 | 1/2018 | Sawada et al. |
| 2018/0030234 A1 | 2/2018 | Priedeman, Jr. |
| 2018/0043627 A1 | 2/2018 | Barclay et al. |
| 2018/0050495 A1 | 2/2018 | Stolyarov et al. |
| 2018/0142077 A1 * | 5/2018 | Kimura ............... B29B 17/0404 |
| 2018/0179332 A1 | 6/2018 | Priedeman, Jr. |
| 2018/0305518 A1 * | 10/2018 | Simonyan .............. B01J 20/265 |
| 2019/0071545 A1 * | 3/2019 | Albrecht .................. C08K 3/22 |
| 2020/0003199 A1 | 1/2020 | Kowada |
| 2020/0207025 A1 | 7/2020 | Priedeman, Jr. |

FOREIGN PATENT DOCUMENTS

| | | |
|---|---|---|
| CN | 104520484 A | 4/2015 |
| EP | 0 659 771 A1 | 6/1995 |
| EP | 0 728 767 A1 | 8/1996 |
| EP | 3689585 A1 | 8/2020 |
| GB | 717840 | 11/1954 |
| GB | 1066188 A | 4/1967 |
| JP | 2008507619 A | 3/2008 |
| JP | 2013247177 A | 12/2013 |
| JP | 2014040085 A | 3/2014 |
| JP | 2017030346 A | 2/2017 |
| KR | 10-2014-0119785 A | 10/2014 |
| WO | 2006020279 A2 | 2/2006 |
| WO | 2006020279 A3 | 2/2006 |
| WO | 2010045147 A2 | 4/2010 |
| WO | 20120143182 A1 | 10/2012 |
| WO | 2014072147 A1 | 5/2014 |
| WO | 2015175682 A1 | 11/2015 |
| WO | 2016059986 A1 | 4/2016 |
| WO | 2016185874 A1 | 11/2016 |
| WO | 2016205690 A1 | 12/2016 |
| WO | 2017112687 A1 | 6/2017 |
| WO | 2017167691 A1 | 10/2017 |
| WO | 2020077127 A1 | 4/2020 |

OTHER PUBLICATIONS

Prosecution history from corresponding U.S. Appl. No. 15/737,579, filed Dec. 18, 2017 including: Restriction Requirement mailed Oct. 22, 2019, Non-Final Rejection mailed Mar. 6, 2020, Non-Final Rejection mailed Nov. 30, 2020, Notice of Allowance mailed Jun. 11, 2021, Notice of Allowance mailed Jul. 9, 2021, Notice of Allowance mailed Sep. 15, 2021; and Notice of Allowance mailed Nov. 2, 2021.

Prosecution history for corresponding U.S. Appl. No. 15/729,410, filed Oct. 10, 2017 including: Notice of Allowance and Fee(s) Due mailed Dec. 11, 2020, Notice of Allowance and Fee(s) Due mailed Oct. 21, 2020, Non-Final Rejection mailed Apr. 2, 2020; and Restriction Requirement mailed Nov. 29, 2019.

Communication pursuant to Article 94(3) EPC from corresponding European Patent Application No. 16738251.4, dated Nov. 27, 2020.

International Search Report and Written Opinion dated Oct. 4, 2016 for corresponding International Application No. PCT/US2016/038140, filed Jun. 17, 2016.

(56) References Cited

OTHER PUBLICATIONS

International Preliminary Report on Patentability dated Dec. 19, 2017 for corresponding International Application No. PCT/US2016/038140, filed Jun. 17, 2016.
International Search Report and Written Opinion of PCT/US2018/055277, mailed Jan. 24, 2019.
Japanese Office Action dated Oct. 30, 2018 for corresponding Japanese Application No. 2017-564868, filed Dec. 14, 2017.
Canadian Office Action dated Nov. 14, 2018 for corresponding Canadian Application No. 2,989,059, filed Dec. 8, 2017.
Japanese Office Action dated Apr. 17, 2019 for corresponding Japanese Application No. 2017-564868, filed Dec. 14, 2017.
Korean Office Action dated Apr. 18, 2019 for corresponding Korean Application No. 10-2018-7001645, filed Jan. 18, 2018.
Canadian Office Action for CA 2,989,059, dated Jun. 17, 2019, 3 pages.
China Office Action, 201680035689.9, Nov. 5, 2019, 11 pages.
Communication pursuant to Article 94(3) EPC from corresponding European Patent Application No. 18797278.1, dated Oct. 6, 2021.
Prosecution history from U.S. Appl. No. 16/643,275, filed Feb. 28, 2020 including: Notice of Allowance and Fee(s) Due mailed Oct. 4, 2021, and Requirement for Restriction/Election mailed Jul. 6, 2021.
Prosecution history for U.S. Appl. No. 16/591,198 including: Non-Final Office Action mailed Dec. 8, 2021 and Restriction Requirement mailed Aug. 30, 2021.
Communication pursuant to Rules 161(1) and 162 EPC from European Patent Application No. 19797448.8, dated May 19, 2021, 3 pages.
Final Rejection from U.S. Appl. No. 16/591,198, mailed Apr. 1, 2022.

* cited by examiner

METHOD FOR UNDERWATER PROCESSING OF WATER-DISPERSIBLE MATERIALS

CROSS REFERENCE TO RELATED APPLICATION(S)

The present application claims the benefit of U.S. Provisional Patent Application Ser. No. 63/173,704 entitled METHOD FOR UNDERWATER PROCESSING OF WATER-DISPERSIBLE MATERIALS that was filed on Apr. 12, 2021, the contents of which is incorporated by reference in its entirety.

BACKGROUND

The present disclosure relates to processing water dispersible polymer-based reaction products and optionally forming the water-dispersible reaction products into a media suitable for further uses. More particularly, the present disclosure relates to using a water-based solution to quench and pelletize a water-dispersible polymer-based reaction product and to optionally process the pellets into a media suitable for further uses, such as, but not limited to, 3D printer feedstocks.

Most polymer-based materials are produced in reactors, such as extruders or autoclaves, at elevated temperatures, which accelerates the reaction kinetics of polymerizing the monomers into chains. However, the amount of reaction time spent in the reactor is directly related to increases in molecular weight, as the monomers polymerize into long chains. In addition, as polymer-based materials are subjected to elevated temperatures over a period of time, the material can begin to thermally degrade. Each polymeric-based material has a thermal-degradation kinetics threshold (TDKT). The TDKT is a time-temperature parameter that defines a rate of thermal degradation of a polymeric material, such as by depolymerization, backbone chain scission, pendant-group stripping, polymer cross linking, and/or oxidation processes.

Manufacturers of polymer-based materials desire to optimize the residence time of the reaction products in the reactor. Batch time optimization is tightly controlled, not only to prevent the reaction product from becoming overly polymerized or too high in average molecular weight, and to avoid approaching the material's TDKT, but especially to maximize production through the reactor by minimizing batch times. However, the amount of hot reaction product within the reactor needs to be cooled quickly to stop the continuing polymerization reaction, and fast cooling/handling of a large quantity of hot, molten reaction product is challenging.

Typically, large batches of molten polymer-based reaction products exiting the reactor are quenched in a water-based bath. In some instances, the material is also pelletized in the water-based bath, as the molten material needs to be processed into a smaller, more manageable form, e.g. pellets, strands or particles. When cooling and pelletizing are be done at the same time, the reaction process can be quickly quenched. Water is a preferred direct contact cooling agent for a variety of reasons. However, when the molten reaction product is a water dispersible polymer-based material, because water-dispersible polymers would simply disperse at first contact by the cooling water source, water-based bath processing becomes an incompatible option for use with water-dispersible polymers.

A typical approach to cooling and pelletizing polymeric water-dispersible ionomers and polyelectrolytes is to use water-free methods, such as thermal heat exchange methods, e.g. a continuous contact cooling belt onto which molten material is extruded form the reactor. Traditional heat exchange equipment would cool molten polymer in large quantities quickly, but the material would solidify in a large unhandleable mass. As compared to a water-based bath, a continuous cooling belt cools the reaction product comparatively slowly relative and unevenly. A continuous belt cooler also has a much larger footprint relative to a water immersion bath. Additionally, the installation of an industrial grade continuous cooling belt can result in excessive capital costs, and long lead fabrication times. Alternative methods for cooling reaction products would be the use of non-water liquid bath and pelletization. However, use of solvents other than water create environmental hazards, and add additional processing costs to the material.

There is a need for a quick, environmentally friendly and cost-effective approach for cooling and pelletizing water-dispersible polymer-based materials.

SUMMARY

An aspect of the present disclosure is directed to a method of processing a water-dispersible, polymer-based material in a bath of a water-based solution. The method includes providing a molten water-dispersible polymer material having monovalent cations. The water-dispersible polymer is introduced into a water bath comprising multivalent salt dissociated in the water bath into multivalent cations and anions. The water-dispersible polymer is quenched in the water bath with the dissociated multivalent cations, while monovalent cations proximate a surface of the water-dispersible polymer are exchanged with multivalent cations to form a barrier that temporarily resists dispersion of the water-dispersible, polymer-based material within the water bath. The method includes removing the water-dispersible polymer from water bath after the exchange step.

A method of treating a water-dispersible, polymer-based material in a bath of a water-based solution. includes reacting monomers within a selected elevated temperature range to form a reaction product of the water-dispersible, polymer-based material having monovalent cations. The method includes pelletizing the water-dispersible, polymer-based material into pellets in a water bath having between about 0.5 wt % and about 4.0 wt % multivalent salts dissociated in the water bath into multivalent cations and anions, and retaining the pellets within the water bath with the dissociated multivalent salts for between about 1 second and about 300 seconds to quench the water-dispersible, polymer-based material while monovalent cations proximate a surface of the pellets are exchanged with multivalent cations. The multivalent cations cause crosslinking at the surface to form a barrier that resists dispersion of the water-dispersible, polymer-based material within the water bath.

Another aspect of the present disclosure is directed to a method of treating a water-dispersible, polymer-based material in a bath of a water-based solution. The method includes providing a molten water-dispersible polymer material having monovalent cations and introducing the water-dispersible polymer in a water bath comprising multivalent salt dissociated in the water bath into multivalent cations and anions. The method includes retaining the water-dispersible polymer within the water bath with the dissociated multivalent cations to quench the water-dispersible, polymer-based material and exchanging the monovalent cations proximate a surface of the water-dispersible polymer with multivalent cations to form a barrier that temporarily resists dispersion of the water-dispersible, polymer-based material within the water bath. The method includes pelletizing the water-dispersible, polymer-based material and removing the water-dispersible polymer-based material from water bath after the exchange step.

Another aspect of the present disclosure is directed to a method of forming a filament of the water-dispersible, polymer-based material. The method includes providing pellets of the water-dispersible, polymer-based material, where the pellets have monovalent cations wherein the monovalent cations have been exchanged with multivalent cations proximate a surface of the pellets wherein the multivalent cations cause crosslinking at the surface of the pellets to form a barrier to moisture. The method includes feeding the pellets in an extruder and heating the pellets to an elevated temperature to cause the water-dispersible, polymer-based material to flow and extruding the flowing material into filament strands wherein the extrusion process causes the crosslinked barrier material to blend into the water-dispersible, polymer-based material such that the crosslinked barrier material does not materially affect the physical properties of the water-dispersible, polymer-based material forming the filament.

Definitions

Unless otherwise specified, the following terms as used herein have the meanings provided below:

The terms "preferred", "preferably", "example" and "exemplary" refer to embodiments that may afford certain benefits, under certain circumstances. However, other embodiments may also be preferred or exemplary, under the same or other circumstances. Furthermore, the recitation of one or more preferred or exemplary embodiments does not imply that other embodiments are not useful, and is not intended to exclude other embodiments from the inventive scope of the present disclosure.

The terms "at least one" and "one or more of" an element are used interchangeably, and have the same meaning that includes a single element and a plurality of the elements, and may also be represented by the suffix "(s)" at the end of the element. For example, "at least one sulfopolymer", "one or more sulfopolymers", and "sulfopolymers (s)" may be used interchangeably and have the same meaning.

The terms "about" and "substantially" are used herein with respect to measurable values and ranges due to expected variations known to those skilled in the art (e.g., limitations and variability in measurements).

The term "providing", such as for "providing a pelletized material", when recited in the claims, is not intended to require any particular delivery or receipt of the provided part. Rather, the term "providing" is merely used to recite parts that will be referred to in subsequent elements of the claim(s), for purposes of clarity and ease of readability.

"Soluble" as referred to herein can be used interchangeably with "disintegrable" and "dissolvable" and relates to materials that disintegrate in a solution or dispersion. Upon disintegration, the support material can break apart into smaller pieces and/or particles of polymer in the solution or dispersion. Some or all of the support material may also dissolve into the solution or dispersion upon disintegration.

"Water soluble" as used herein relates to materials that dissolve in tap water that is about neutral pH. It is understood that the pH of tap water can vary depending on the municipality and as such the pH can vary between about 5 and about 9. Although these pH's are slightly basic or slightly acidic, the defining feature of the water soluble materials is that they do not require an acidic or basic solution to disintegrate and can disintegrate in water at about neutral pH, e.g. tap water.

"Dispersible" as referred to herein can be used interchangeably with "disintegrable", "soluble" and "dissolvable" and relates to materials that disintegrate in a solution or dispersion. Upon disintegration, the support material can break apart into smaller pieces and/or particles of polymer in the solution or dispersion. Some or all of the support material may also dissolve into the solution or dispersion upon disintegration.

"Water dispersible" as used herein relates to materials that dissolve in tap water that is about neutral pH. It is understood that the pH of tap water can vary depending on the municipality and as such the pH can vary between about 5 and about 9. Although these pH's are slightly basic or slightly acidic, the defining feature of the water dispersible materials is that they do not require an acidic or basic solution to disintegrate and can disintegrate in water at about neutral pH, e.g. tap water.

All publications disclosed herein are incorporated by reference in their entireties.

DETAILED DESCRIPTION

The present disclosure relates to a method of quenching a water-dispersible, polymer-based material in a bath of a water-based solution. Using the disclosed method, submerging the water-dispersible, polymer-based material does not adversely affect the solubility properties of the water-dispersible polymer after being discharged from a reactor. The water dispersible, polymer-based material is typically produced in the reactor at elevated temperatures, such as, but not limited to, between about 200° C. and about 300° C. The polymerization reaction will continue until the batch is quenched by quickly reducing the temperature. If the polymerization reaction is allowed to continue after exiting the reactor, the reaction product will continue to polymerize, which can cause the reaction product to have too high of a molecular weight to be within desired specifications. The molecular weight of the overall polymer batch is important for providing preferred finished polymer product properties, such as glass transition temperature, melt viscosity, etc.

The bath is a water-based solution containing a selected amount of multivalent salts that are dissociated into multivalent cations and anions. The multivalent salts are selected based upon pH neutrality, high solubility in water, compatibility with processing equipment, such as stainless steel, typically 304 or 316 stainless steel or carbon steel, and are substantially environmentally safe and neutral. An exemplary, non-limiting multivalent salt that meets these criteria for use in the water bath is magnesium sulfate, which is commonly referred to as Epsom salt.

The water bath is an effective way to quickly cool and stabilize the water-dispersible, polymer-based reaction product, while allowing the polymer-based reaction product to be cooled using the direct contact advantage of cold water, by exchanging labile monovalent cations proximate the surface of the reaction product with the free multivalent cations in the water bath. The multivalent cations crosslink the polymer-based reaction product to form a barrier on the outer surface. The barrier greatly increases the resistance of the water-dispersible, polymer-based material to forming a dispersion in the water bath, retaining the water-dispersible material in a solid form. Therefore, the heated reaction product can be quickly and easily quenched in a water bath without substantially adversely affecting the overall physical properties of the water-dispersible, polymer-based material.

The reaction product is typically extruded from the reactor, such as a reactive extruder or an autoclave with a gear pump, in strands or filaments and transferred into the water bath having the dissociated multivalent cations. While the strands or filaments are quenched into the water submersion bath to cool and coat them. In another option for processing hot material, it can also be pumped into an underwater pelletizing device, which circulates the multivalent salt bath amongst the droplets created via a gear pump impeller. The droplets are thus coated and cooled via the bath solution. The dissociated multivalent cations then exchange with the monovalent cations and crosslink the outer surface of the pellets or droplets, to form the barrier and provide water resistance while in the water bath. The pellets remain in the water bath with the dissociated multivalent cations for a sufficient amount of time to prevent the pellets from sticking together due to tackiness on the surface caused by an insufficient amount of crosslinking. An exemplary and non-limiting time for the pellets to be in the water bath ranges from about 1 second to about 300 seconds and more typically between about 5 second and about 150 seconds. Even more preferably, another exemplary and non-limiting time for the pellets in the water bath ranges from about 8-15 seconds.

Once the pellets or droplets are sufficiently crosslinked, they are removed from the water bath and dried. The dried pellets can be packaged for storage, further processed within the same facility and/or transportation to another facility for further processing. By way of example, the pellets or droplets having the cross-linked outer surface can be extruded into filaments or wafers, further pelletized or ground into a powder, all for additive manufacturing systems. However, the present disclosure is not limited to applications in additive manufacturing. The further processed material no longer has the surface coating of the previously coated larger format material. It continues to have its water-dispersible properties.

Prior to the disclosed coating step, the water-dispersible, polymer-based material can be formed as a reaction product of a monovalent substituted isophthalic acid such as, but not limited to 5-sodiosulfoisophthalic acid, or a similar acid, when forming the reaction product with a condensation reaction with at least another monomer to form sulfopolyesters, sulfopolyamides, sulfopolyesteramides, sulfopolyurethanes and blends thereof. Instead of a condensation reaction product, the sulfopolyesters, sulfopolyamides, sulfopolyesteramides, sulfopolyurethanes, sulfopolystyrenes and blends thereof can be formed with an addition reaction to form pendant groups. Whichever reaction mechanism is utilized to produce the water-dispersible, sulfopolyesters, sulfopolyamides, sulfopolyesteramides, sulfopolyurethanes, sulfopolystyrenes and blends thereof, the water dispersible polymer will have similar physical properties including, but not limited to, glass transition temperature, heat deflection temperature and dispersion rate in a water bath. Examples of suitable water-dispersible, sulfopolyesters, sulfopolyamides, sulfopolyesteramides, sulfopolyurethanes and blends or disclosed in U.S. Patent Application Publication Nos. 2018/0179332, 2020/00031993, 2020/0207025 and WO 2020/077127, wherein each cited publication is incorporated by reference in its entirety.

Once the reaction product is produced with monovalent cations, using cations such as sodium or lithium, at the elevated temperatures ranging from between about 200° C. and about 300° C. in a reactor, the exiting reaction product is formed into strands or droplets. The strands or droplets are then processed in a water bath with the dissociated multivalent ionic solution. The water bath consists of tap water that is typically at a temperature ranging from above 32° F. to about 80° F. and more typically about 35° F. to about 65° F.

A multivalent salt that is lower cost, pH neutral, has high solubility in water, is non-corrosive to 304 or 316 stainless steel, and is substantially environmentally neutral is then added to the water at a weight percent ranging from 0.5 wt % to about 4 wt % based upon the weight of the water in the bath. For instance, a solution of 4 wt % of multivalent salt would include 40 grams of multivalent salt per 1,000 grams/1 liter of water. An exemplary, but non-limiting, multivalent salt is magnesium sulfate or Epsom salt.

An exemplary process for producing pellets of water-dispersible, polymer-based material is illustrated in FIG. 1. Base materials are fed into a reactor at step 10 where the polymerization occurs to produce the water-dispersible, polymer-based material at a temperature between about 200° C. and about 300° C. The molten water-dispersible, polymer-based material are then fed into a water bath at step 12 containing water at room temperature with dissociated multivalent salts at a selected concentration ranging from about 0.5 wt % and about 4 wt % and more particularly between about 1 wt % and about 3 wt %. While in the water bath, the monovalent cations proximate the surface of the material are exchanged with the multivalent cations at step 14, which results in a barrier being formed on the surface by crosslinking that is temporarily water repellant at step 16. The polymer with the barrier is then dried at step 18 and stored in a container.

Referring to FIG. 2, a process is disclosed that utilizes an extruder to form the water dispersible, polymer-based material. The polymerization reaction occurs in the reactor which can be an extruder and the molten water-dispersible, polymer-based material exists the reactor at step 20. The material is then processed into strands and immersed into a water bath with dissolved multivalent salts at step 22. The strands are passed through and are cooled in the water bath where the strands harden and crosslinked temporary water-resistant barrier is formed at step 24. The strands are fed into a pelletizer at step 26 to form chopped pellets. The pellets are then dried at step 28.

Referring to FIG. 3, another process is disclosed that utilizes an extruder to form the water dispersible, polymer-based material. The polymerization reaction occurs in the reactor and the molten water-dispersible, polymer-based material exists the reactor at step 30. A pump, such as a gear pump, is used to pump the water-dispersible, polymer-based material into an underwater pelletizer stream which contains dissolved multivalent salts at step 32. Droplets of the molten water-dispersible, polymer-based material are quenched and hardened while exchanging multivalent cations into the droplets proximate the surface to form a temporary water-resistant barrier at step 34. The hardened droplets are then dewatered, typically with a centrifuge at step 36. The droplets with the barrier are then dried at step 38.

Figure 1:
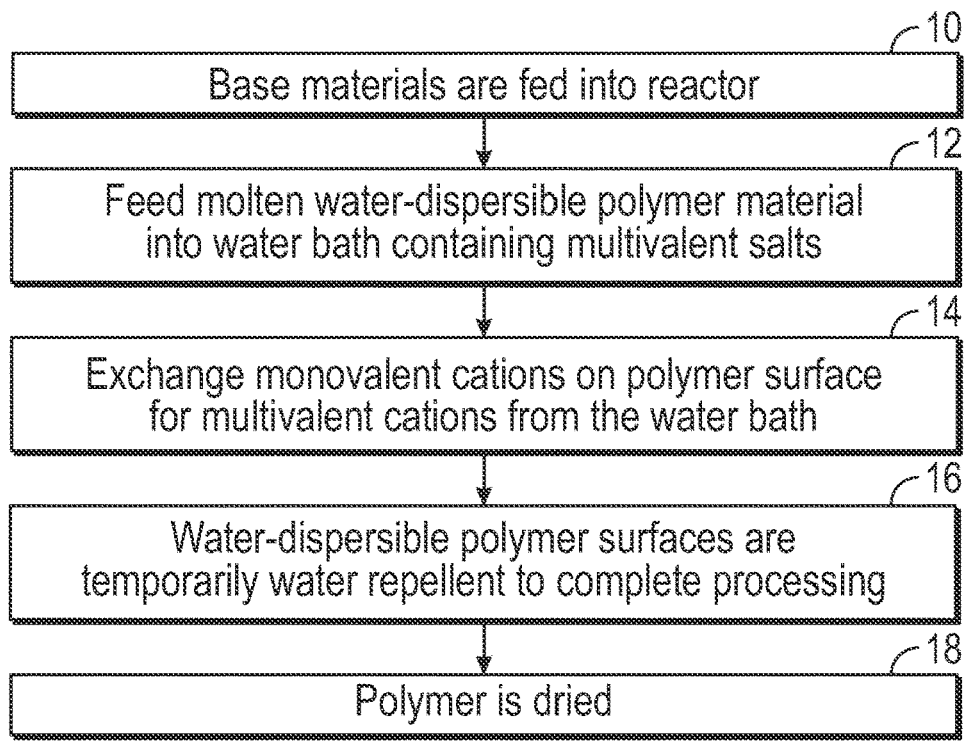
FIG. 1 is a flow chart of a method of producing a water-dispersible, polymer-based material with a moisture barrier, after polymerization reaction of the base resin.
Figure 2:
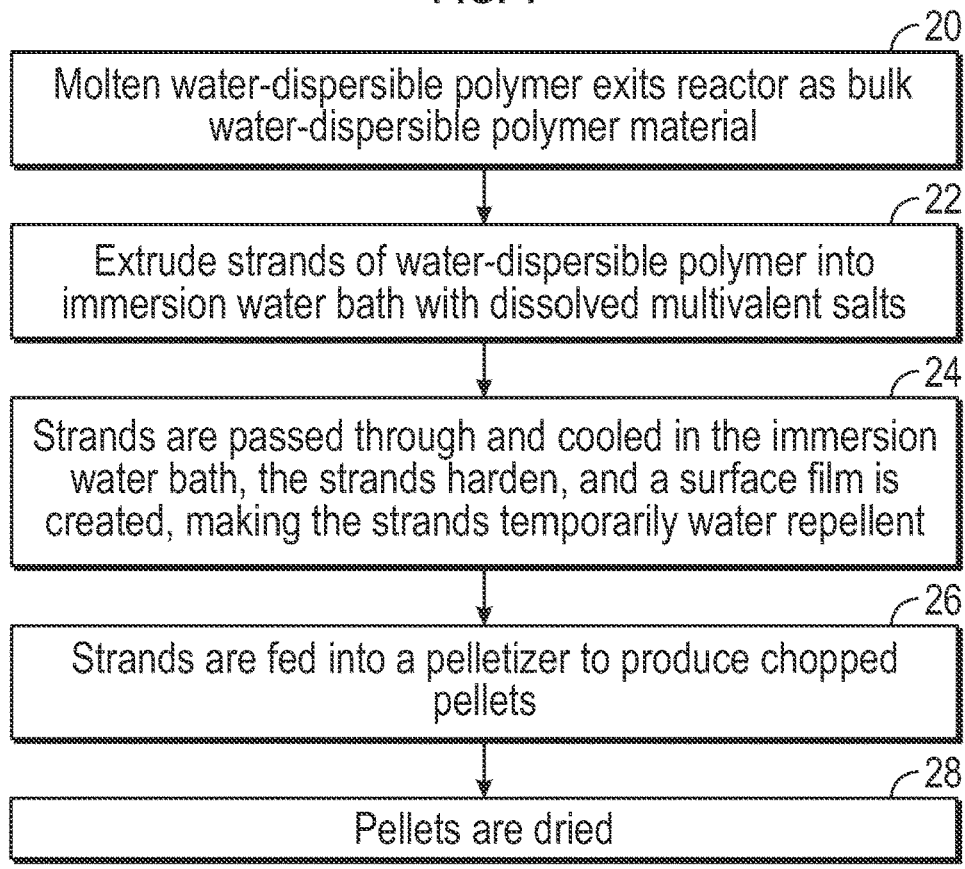
FIG. 2 is a flow chart of a method of producing pelletized water-dispersible, polymer-based material with a moisture barrier, after polymerization reaction of the base resin.
Figure 3:
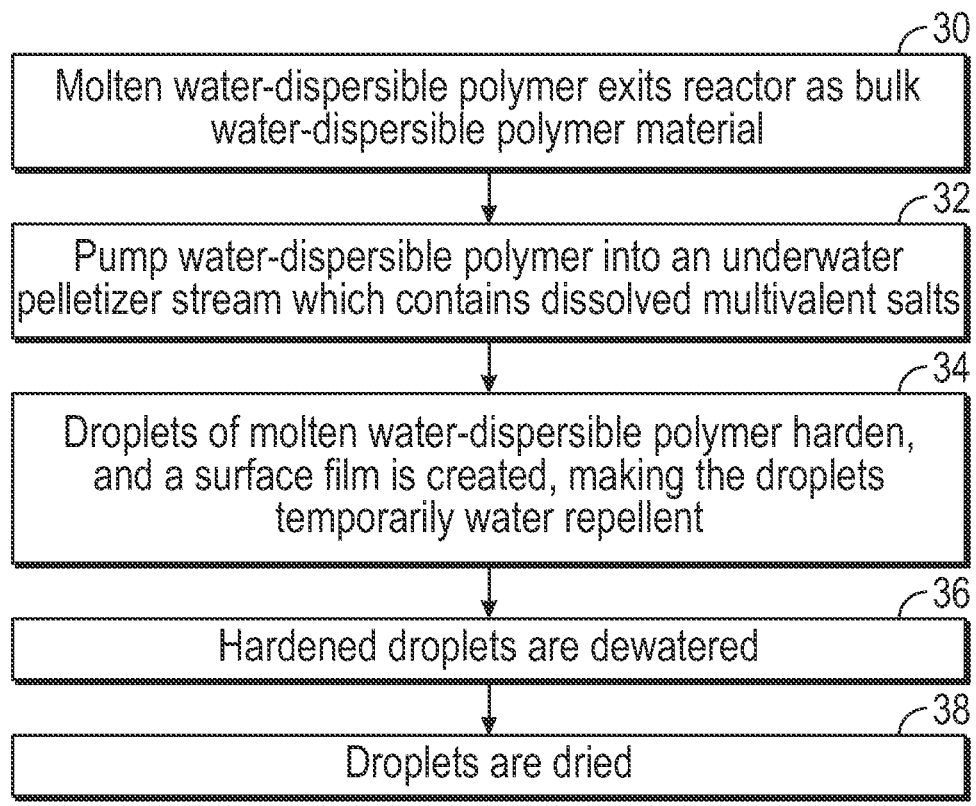
FIG. 3 is a flow chart of another method of producing pelletized water-dispersible, polymer-based material with a moisture barrier, after polymerization reaction of the base resin.
Figure 4:
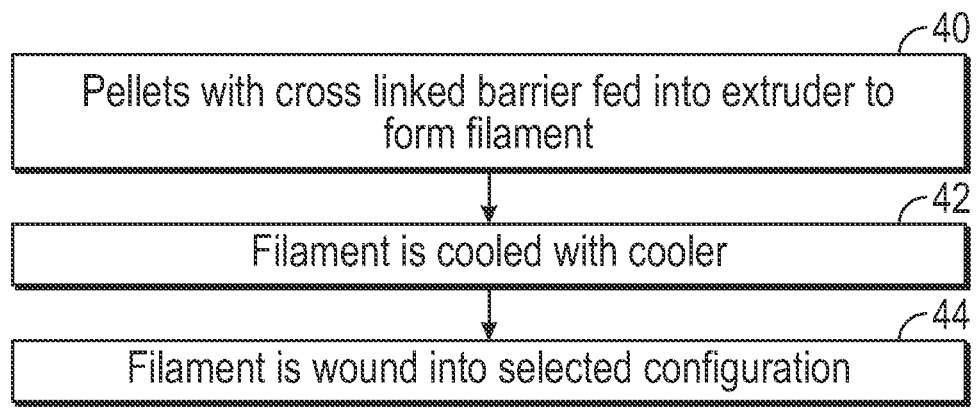
FIG. 4 is a flow chart of a method of forming a filament from pre-made pellets of water-dispersible, polymer-based material having a moisture barrier.

Referring to FIG. 4, in an exemplary application for producing filament of the water-dispersible, polymer-based material, based on remelting the pellets with the previously cross-linked barrier, are processed in an extruder to form a filament at step 40. The extruder heats the pellets into a molten state where the crosslinked barrier material is at such a sufficiently small weight percent that when the pellets are formed into a filament, the cross-linked barrier material blends into the filament and does not substantially affect the physical properties of the water-dispersible, polymer-based material. Once the filament is extruded from the extruder, the filament is cooled with a cooler at step 42, or alternatively cooled again with immersion into another Epsom salt bath, and wound into a selected configuration with a winder at step 44. The wound filament is then suitable for use in an extrusion based additive manufacturing system.

The further processing is not limited to the formation of filament, rather the material can be further processed for any suitable purpose. Additionally, the further processing can be conducted in the same facility that produced the pellets with the barrier or at a different facility.

In addition to forming the water-dispersible, polymer-based material into a filament, the water-dispersible, polymer-based material may alternatively be provided to an extrusion-based additive manufacturing system in powder form for use in a screw auger-fed print head.

In this embodiment, the water-dispersible, polymer-based material is preferably pelletized or otherwise micronized and/or classified to attain desired powder particle sizes for use in the screw-auger-fed print head. Examples of suitable average particles sizes for the water-dispersible, polymer-based material powder range from about 15 micrometers to about 125 micrometers, and in some embodiments from about 20 micrometers to about 50 micrometers.

Moreover, the water-dispersible, polymer-based material may be provided in powder form for use in other powder-based additive manufacturing systems, such as selective laser sintering systems (e.g., systems disclosed in Deckard, U.S. Pat. Nos. 4,863,538 and 5,132,143), high speed sintering systems, powder/binder systems (e.g., systems disclosed in Sachs et al., U.S. Pat. No. 5,204,055), sand casting systems, electron-beam systems, and the like. Additional systems for the embodiment include those disclosed in Mannella et al., U.S. Pat. No. 8,221,858. In these embodiments, the support material is also preferably pelletized or otherwise micronized and/or classified to attain desired powder particle sizes for use in the particular system.

In another embodiment, the water-dispersible, polymer-based material is configured for use in an electrophotography-based additive manufacturing system. Examples of suitable electrophotography-based additive manufacturing systems for this embodiment include those disclosed in Hanson et al., U.S. Pat. Nos. 8,879,957 and 8,488,994, and Comb et al., U.S. Publication Nos. 2013/0186549 and 2013/0186558.

In electrophotography-based methods, during a printing operation, EP engines may develop or otherwise image each layer of the part and support materials using the electrophotographic process. The developed layers are then transferred via a transfer assembly to a layer transfusion assembly where they are transfused (e.g., using heat and/or pressure) to print one or more printed parts and support structures in a layer-by-layer manner. Accordingly, the water-dispersible, polymer-based material of the present disclosure is preferably thermally stable while being transfused at a layer transfusion assembly.

EXAMPLES

The present disclosure is more particularly described in the following examples that are intended as illustrations only, since numerous modifications and variations within the scope of the present disclosure will be apparent to those skilled in the art.

Example 1—Solubility of the Base Resin Material

Ten grams of pellets of water-dispersible sulfopolyamide, as made from a formula disclosed in U.S. Application Publication No. 2018/0179332, were placed in a 200 ml bath of tap water that was at 70° C., and stirred at 300 rpm. The pellets completely dispersed into the tap water in less than five minutes.

Example 2—Preparing a Water-Dispersible Filament from Pellets, Using the Water Bath Treatment 2 mm pellets of pre-prepared water-dispersible sulfopolyamide resin, having a formula disclosed in U.S. Application Publication No. 2018/0179332, were melt extruded at over 400° F. (above melting temperature) as molten strands. A cold Epsom salt bath solution was prepared, using a concentration of about 4 wt % Epsom salt (USP grade) that was dissociated in one liter of 50° F. cold tap water. The molten strands were passed through the Epsom salt solution bath for 10 seconds, and the strands did not dissolve or disperse in the water bath upon the cooling immersion step, resulting in a finished filament format product that was not sticky or tacky to the touch.

Alternatively, a control water bath solution was also prepared using one liter of cold tap water, and no Epsom salts. The molten strands of water-dispersible sulfopolyamide were passed through the control water bath, and immediately produced a cloudy dispersion, indicating that the polymers were beginning to dissolve as the hot filament passed through the bath. This experiment demonstrates a crosslinked barrier was formed on the surface of the strands, when treated in the water bath with Epsom salts, providing the extruded strands with enough water repellency to complete the water-cooling process and avoid dissolution.

Example 3—Soak Test of Finished Water-Dispersible Filament of Example 2

A 3" strand of filament of water-dispersible sulfopolyamide, having a formula disclosed in U.S. Application Publication No. 2018/0179332, and previously prepared using the disclosed water bath treatment, was immersed in a 100 ml beaker of cold tap water. The filament strand was soaked in the solution for about 5 minutes, or about 300 seconds. A second strand of water-dispersible filament which was not treated in the water bath contain Epsom salt, was also soaked in a 100 ml beaker of cold tap water. The dissolution process was timed and observed. The untreated control filament immediately began to form a cloudy solution, and dispersed over about a 20 minute period. The treated filament did not create a cloudy solution, and appeared to have no dissolution for about 10 minutes. After the thin surface barrier coating was dissolved, it began to disperse completely, as is required for a water-dispersible filament material. While not being bound to theory, it is believed that the thin barrier layer was shed due to the swelling of the material within the core of the filament, creating more exposure of the inner uncoated material to the available water solution Example 4—Preparing a Water-Dispersible Filament from Molten Reacted Resin, Using the Water Bath Treatment Molten water-dispersible sulfopolyamide, having a formula disclosed in U.S. Application Publication No. 2018/0179332, was extruded after polymerization at over 400° F. (above melting temperature) to make molten strands. A 50° F. bath solution was prepared, using a concentration of about 2 wt % Epsom salt (USP grade) per liter of water. The molten strands were passed through the Epsom solution bath to treat the outer surface of the strand, while cooling the strands. The strands did not dissolve or disperse in the water bath during the cooling immersion step, resulting in a finished filament format product that was not sticky or tacky to the touch.

Although the present disclosure may have been described with reference to preferred embodiments, workers skilled in the art will recognize that changes may be made in form and detail without departing from the spirit and scope of the disclosure.

The invention claimed is:

1. A method of processing a water-dispersible, polymer-based material in a bath of a water-based solution, the method comprising:
providing a molten water-dispersible polymer material having monovalent cations;
introducing the water-dispersible polymer in a water bath comprising multivalent salt dissociated in the water bath into multivalent cations and anions;
retaining the water-dispersible polymer within the water bath with the dissociated multivalent cations to quench the water-dispersible, polymer-based material and exchange the monovalent cations proximate a surface of the water-dispersible polymer with multivalent cations to form a barrier that temporarily resists dispersion of the water-dispersible, polymer-based material within a water based solution, and
removing the water-dispersible polymer from water after the exchange step.

2. The method of claim 1 and further comprising pelletizing or forming droplets of the water-dispersible polymer material in the water bath.

3. The method of claim 1, wherein the multivalent salt comprises divalent, trivalent salts, or divalent and trivalent salts, and optionally sodium cations.

4. The method of claim 1, wherein the multivalent salts comprise magnesium sulfate.

5. The method of claim 1, wherein the molten water-dispersible polymer material is at a temperature between about 200° C. and about 300° C.

6. The method of claim 1, wherein the water bath comprises between about 0.5 wt % and about 4.0 wt % multivalent salts dissociated in the water bath into multivalent cations and anions.

7. The method of claim 1, wherein the water bath is at a temperature in a range between about 35° F. to about 65° F.

8. The method of claim 1, wherein the water-dispersible, polymer-based material comprises sulfopolyesters, sulfopolyamides, sulfopolyesteramides, sulfopolyurethanes and blends thereof.

9. A method of treating a water-dispersible, polymer-based material in a bath of a water-based solution, the method comprising:
providing a molten water-dispersible polymer material having monovalent cations;
introducing the water-dispersible polymer in a water bath comprising multivalent salt dissociated in the water bath into multivalent cations and anions;
retaining the water-dispersible polymer within the water bath with the dissociated multivalent cations to quench the water-dispersible, polymer-based material and exchange the monovalent cations proximate a surface of the water-dispersible polymer with multivalent cations to form a barrier that temporarily resists dispersion of the water-dispersible, polymer-based material within a water based solution,
pelletizing the water-dispersible, polymer-based material; and
removing the water-dispersible polymer-based material from water after the exchange step.

10. The method of claim 9 wherein the pelletizing step is performed underwater in the water bath.

11. The method of claim 9 wherein the pelletizing step is performed away from the water bath after the barrier is formed.

12. The method of claim 10 and further comprising:
removing the pellets with the barrier from the water bath;
drying the pellets; and
storing the dried pellets in a container.

13. The method of claim 9, wherein the multivalent salts comprise magnesium sulfate.

14. The method of claim 9, wherein the molten water-dispersible polymer material is at a temperature in the range between about 200° C. and about 350° C.

15. The method of claim 9, wherein the water bath comprises between about 0.5 wt % and about 4.0 wt % multivalent salts dissociated in the water bath into multivalent cations and anions.

16. The method of claim 9, wherein the water bath is at a temperature in a range between about 35° F. to about 65° F.

17. The method of claim 9, wherein the water-dispersible, polymer-based material comprises sulfopolyesters, sulfopolyamides, sulfopolyesteramides, sulfopolyurethanes, sulfopolystyrenes and blends thereof.

* * * * *